(No Model.)
A. BELL.
SPRING BED BOTTOM.
No. 336,202. Patented Feb. 16, 1886.
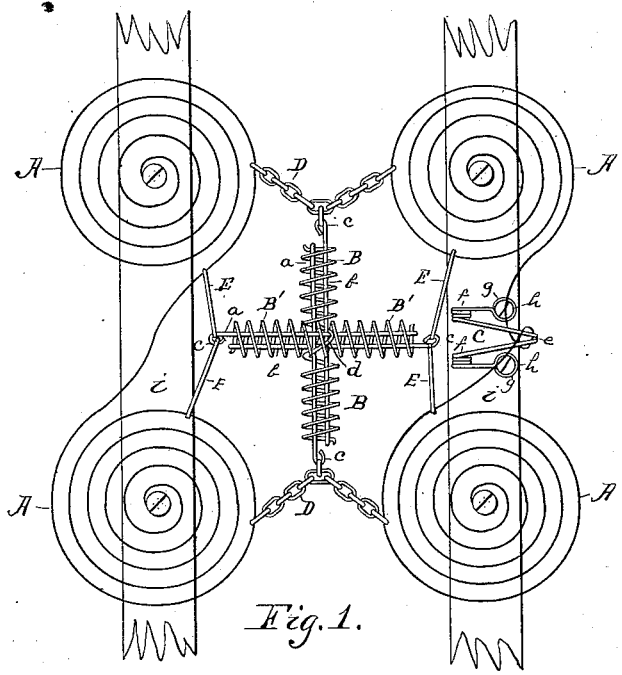
Fig. 1.
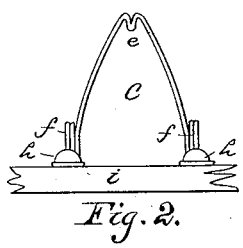
Fig. 2.
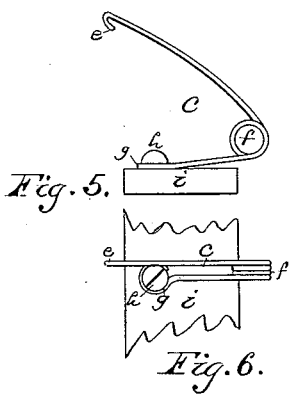
Fig. 5.
Fig. 6.
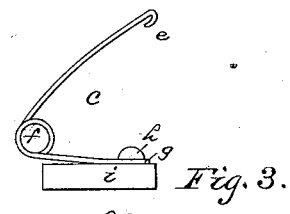
Fig. 3.
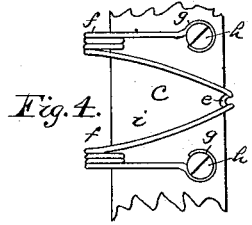
Fig. 4.
WITNESSES:
Henry T. Dechert
Chas. A. Mahony
INVENTOR
Alonzo Bell
by his attorney
Chas. A. Rutter

UNITED STATES PATENT OFFICE.

ALONZO BELL, OF PHILADELPHIA, PENNSYLVANIA.

SPRING BED-BOTTOM.

SPECIFICATION forming part of Letters Patent No. 336,202, dated February 16, 1886.

Application filed October 28, 1885. Serial No. 181,151. (No model.)

*To all whom it may concern:*

Be it known that I, ALONZO BELL, a citizen of the United States, and a resident of the city and county of Philadelphia, and State of Pennsylvania, have invented certain new and useful Improvements in Spring Bed-Bottoms, of which the following is a specification.

My invention relates to improvements in that class of spring bed-bottoms in which upright helical springs are used; and the object of my invention is to furnish a spring for coupling the tops of these helical springs together which will operate by compression, and which cannot be stretched out of shape, and to furnish, in connection with these connecting-springs, a side supporting-spring for keeping the tops of the main bed-springs in line.

In the accompanying drawings, forming part of this specification, and in which similar letters of reference indicate similar parts throughout the several views, Figure 1 is a plan of four ordinary helical bed-springs with my improvements attached; Figs. 2, 3, and 4, front and side elevations and plan of my double side supporting-springs, and Figs. 5 and 6 a side elevation and plan of a single side supporting-spring.

A are the bed-springs; B B', my connecting-springs, and C the side supporting-springs. The connecting-springs B B' have rods or wires *a b* secured to their ends and passing through their cores. The outside ends of these rods are furnished with hooks or eyes *c*, which are secured to chains D or to rods E, which are in turn secured to the main bed-springs A. The springs B B' are placed at right angles and intersect each other at their centers, and the spring B has its middle drawn out, as shown at *d*, so that this intersection can be made. When the springs A are compressed and drawn apart by a person sitting or lying upon them, the chains D or wires E will be drawn out, and will draw with them the rods *a b*, which will compress the springs B B', which will give much greater stiffness to the springs A, and which prevent them from being drawn too far apart. As the springs B B' are compressed instead of being extended, they will be more durable than springs that are extended, and they cannot be drawn out of shape, as is very often the case with springs which operate by extension.

Where helical springs are used in a bed or other piece of furniture, it is usual to have the outside rows of springs connected to the slats by means of chains, to prevent these springs from being drawn out of perpendicular and so cause inequalities in the surface of the bed or other piece of furniture. These chains are often unreliable, and are always objectionable on account of the rattling that they cause.

In Figs. 2 to 6 are shown different views of side supporting-springs that I use instead of the chains above mentioned. These springs may be double, as shown in Figs. 2, 3, and 4, or single, as shown in Figs. 5 and 6, although on account of stiffness and strength I prefer to use the double spring. The double spring is made of a piece of wire, which is doubled, and has its middle formed into a hook, *e*, which is placed over the wire forming the main bed-spring A. Each side of the wire is bent round, forming a coil, *f*, and its ends are formed into eyes *g*, through which screws *h* pass, to secure the spring to the slats *i*, which carry the springs A. If the spring is a single spring, it is constructed as shown in Figs. 5 and 6. This side supporting-spring has to be used in connection with the main springs A and the coupling-springs B B', or their equivalents, and it prevents the outside rows of springs A, and through springs A and B the inside springs, from becoming drawn out of perpendicular.

I am aware that it is not new to construct a spring with rods attached to its ends and passing through its core, and I am also aware that springs of this description have been used to connect the tops of bed-springs; and hence I do not claim a compression-spring for this purpose, broadly; but What I do claim is—

The herein-described device for connecting the tops of helical bed-springs A together, consisting of two springs, B B', intersecting each other at right angles at their centers and furnished with rods *a b*, passing through their cores, one end of said rods being secured to the said springs, and the other to the rods or chains D E, substantially as and for the purposes set forth.

ALONZO BELL.

Witnesses:
WILLIAM M. STEWART, Jr.,
CHAS. A. RUTTER.